United States Patent
Viola et al.

(10) Patent No.: US 6,961,322 B2
(45) Date of Patent: Nov. 1, 2005

(54) DYNAMIC INTERNET PROTOCOL ADDRESS MANAGEMENT METHOD

(75) Inventors: Cindy J. Viola, Tempe, AZ (US); Thomas Peter Emmons, Jr., Mesa, AZ (US); Douglas A. White, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 836 days.

(21) Appl. No.: 09/962,874

(22) Filed: Sep. 24, 2001

(65) Prior Publication Data

US 2003/0058813 A1 Mar. 27, 2003

(51) Int. Cl.⁷ .............................................. H04Q 7/00
(52) U.S. Cl. ...................................... 370/328; 709/245
(58) Field of Search ................................ 370/328, 331, 370/336, 338, 349, 401, 395.52; 455/436, 455/452.1, 456.2; 709/217, 225–227, 245

(56) References Cited

U.S. PATENT DOCUMENTS

| | | | |
|---|---|---|---|
| 6,219,715 B1 * | 4/2001 | Ohno et al. ................. | 709/245 |
| 6,473,411 B1 * | 10/2002 | Kumaki et al. ............. | 370/331 |
| 6,510,153 B1 * | 1/2003 | Inoue et al. ................ | 370/354 |
| 6,618,757 B1 * | 9/2003 | Babbitt et al. ............. | 709/226 |
| 6,769,000 B1 * | 7/2004 | Akhtar et al. ........... | 707/103 R |

\* cited by examiner

*Primary Examiner*—Man U. Phan
*Assistant Examiner*—Toan Nguyen
(74) *Attorney, Agent, or Firm*—Frank J. Bogacz; Kevin D. Wills

(57) ABSTRACT

A method manages an internet protocol address and time of validity. The method obtains (52) the IP address and validity time period for a mobile station (10). The IP address and validity time period are transmitted (53) to the mobile station (10). Prior to expiration of the validity time period the network (20) renews the IP address for a new validity time period.

4 Claims, 2 Drawing Sheets

DYNAMIC INTERNET PROTOCOL ADDRESS MANAGEMENT METHOD

BACKGROUND OF THE INVENTION

The present invention pertains to internet networks and more particularly to a method for managing dynamic internet address leasing.

Mobile stations or handsets may connect to the internet to activate certain applications through various servers. To access the internet, an Internet Protocol address is required. Internet Protocol addresses are typically stored within the handset for a time period. These Internet Protocol addresses are leased, that is they are available for use for a certain time. Mobile handsets may go off the air for some time and not interconnect to reestablish a new Internet Protocol address before the old Internet Protocol address expires.

Requiring the mobile handset to renew its address requires considerable amounts of air time and interface with the internet. Establishing or reestablishing a new Internet Protocol address is "expensive" in terms of air time required of a mobile handset.

In addition, applications serving mobile handsets need a reliable validity time for Internet Protocol addresses dynamically assigned to handsets. And handsets need to know their own address validity time so they can provide the time in application registrations.

Accordingly, what is needed is a method for managing Internet Protocol address lease time for mobile users.

DESCRIPTION OF THE PREFERRED EMBODIMENT

Figure 1:
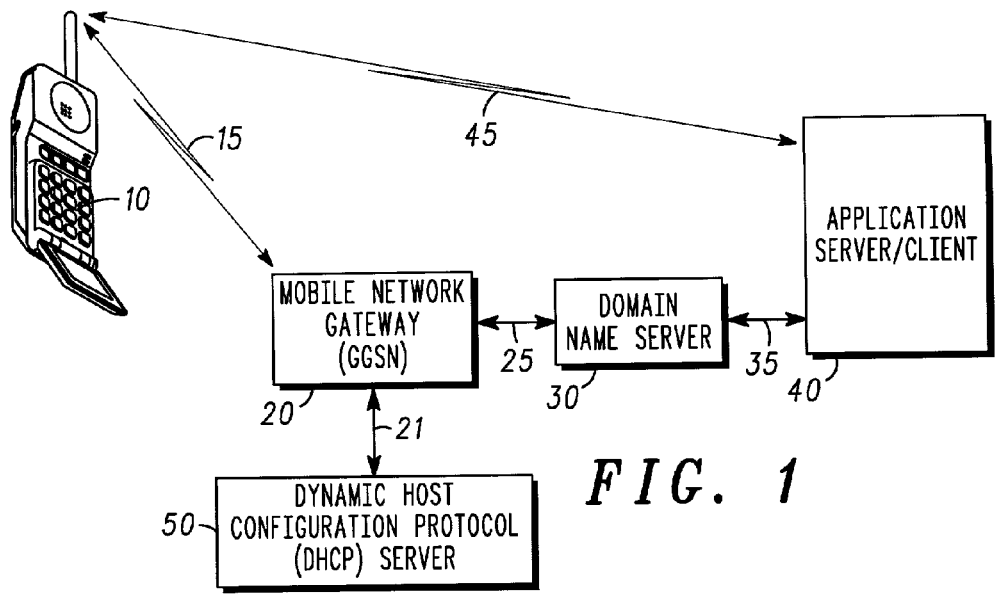
FIG. 1 is a block diagram of a handset interconnection for supporting mobile Internet Protocol in accordance with the present invention.

Referring to FIG. 1, a block diagram of a mobile handset 10 access to the network 20 is shown. Mobile station or handset 10 transmits a Packet Data Protocol (PDP) context activation 15 to get a dynamic Internet Protocol address from mobile network gateway (MNG) 20 (for GPRS services that is the Gateway GPRS Support Node or GGSN). In response MNG 20 may either allocate an address from a pool of addresses owned by the gateway or request an address 21 from a separate server such as a Dynamic Host Configuration Protocol (DHCP) server 50. If the address is allocated from a pool of addresses owned by the gateway, the gateway determines the time limit on the address. If the address is retrieved from a separate server 50, that server 50 provides the address and the time limit on the address.

If the handset 10 provided a name to be registered, the gateway also makes a DNS registration request 25 to Domain Name Server 30. The gateway includes the address and time limit with the handset name as part of the registration request.

Internet ProtocolMobile network gateway 25 returns the internet address and time limit on the address via the activation link 15 to handset 10. Handset 10 may then register for services with the application server/client via direct application level registration 45. The handset 10 may also rely upon the application server/client 40 to retrieve the handset 10 Internet Protocol address and time from Domain Name Server 30 via a DNS query 35. This query 35 will then provide application server/client with the Internet Protocol address of handset 10 and the time for which that Internet Protocol address is valid.

When a handset requests a PDP activation, if a dynamic Internet Protocol address is assigned as part of the activation, then the present invention adds capability in the handset to receive the expiration time and to make requests of the network from (?) management of the IP address and the expiration time.

Figure 2:
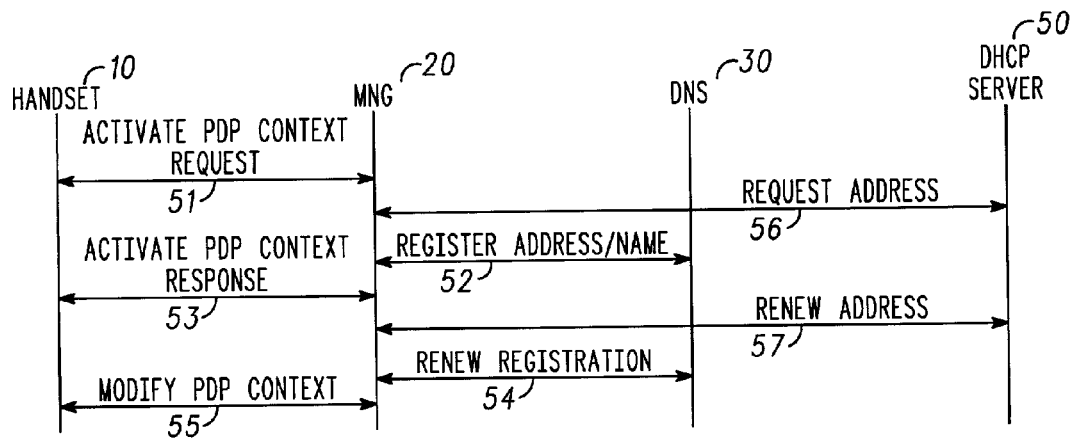
FIG. 2 is a message flow diagram of an Internet Protocol address management by the network in accordance with the present invention.

Referring to FIG. 2, a message flow diagram for a mobile handset dynamic Internet Protocol address activation and management is shown. Handset 10 transmits an activate PDP context request 51 to the MNG 20. The mobile network gateway 20 may already have a pool of IP addresses and if so, will send an address back to handset 10. If the MNG 20 does not have a local pool of IP addresses, MNG 20 will retrieve an IP address and time of activation from Dynamic Host Configuration Protocol (DHCP) server 50 via a request for address 56. This request will provide the IP address and a time for which the IP address is valid.

If there is a name to be registered for this handset (either provided directly by the handset or provisioned into the mobile network), the MNG 20 will request registration 52 and provide the name, IP address and time for which the IP address is valid to the Domain Name Server (DNS) as part of the registration request.

If either the MNG 20 had a pool of available IP addresses or received one from the DHCP server 50, gateway 20 will respond to handset 10 with an activate PDP response 53 which includes the IP address and the time the address is valid.

The handset 10 may register its IP address to applications 40 to contact the handset at a later time. This allows the application 40 to know the IP address required to communicate with the handset and the validity time for that address.

As time passes, the validity of the handset 10 IP address is reaching the end of its time. Since the MNG 20 has been given the ability to store the handset name, IP address and expiration time, the MNG 20 will either renew the address time in its internal address pool or submit a renew address request to DHCP 50 via message 57. If MNG 20 requested address time renewal from DHCP server 50, server 50 will respond with an authorization for renewal and extension of time.

After the address time has been renewed, if the handset has a name registration to maintain, MNG 20 will submit a renew address/name registration request to DNS 30 via message 54.

MNG 20 will then modify the PDP information and transmits to handset 10 via message 55 the new expiration time for the associated IP address when the handset is logged on to the network. Thereby the "lease time" for the Internet Protocol address has been extended without intervention of the handset 10.

Internet ProtocolThis invention would include passing the handset name, optionally, and returning the validity time of the IP address to the handset. As a result, the handset does not have to "log in" and "log off" to the network whenever its IP address time expires nor does the handset need to monitor the validity time of the IP address. This takes several interactions of the handset and considerable air time to achieve these administrative "log on" and "log offs". As a result, air time is minimized and cost is saved. Also, battery life of the internet handset 10 may be extended.

Figure 3:
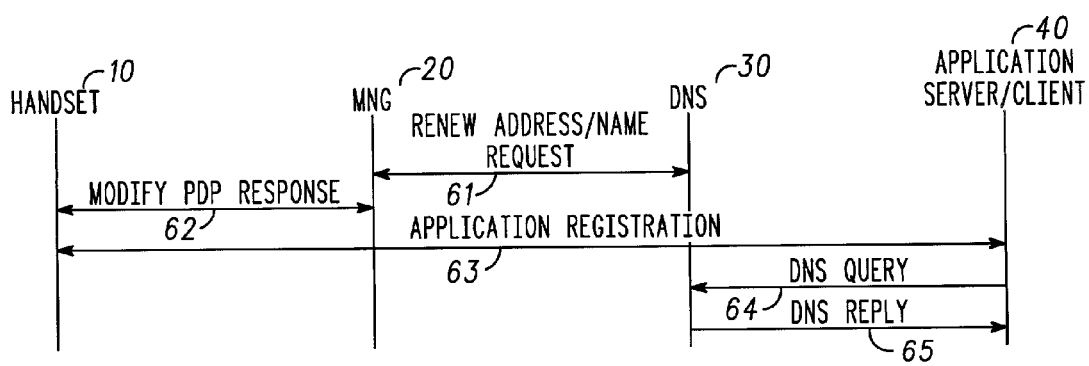
FIG. 3 is a message flow diagram of an Internet Protocol address request for a time extension in accordance with the present invention.

FIG. 3 is a message flow diagram of the lease time renewal for handset 10 IP address. MNG 20 transmits renewal address/name registration 61 to the Domain Name Server 30. The registration renewal 61 includes the handset name, IP address and the previous time of expiration for handset 10.

Next, MNG 20 transmits a modify PDP message which gives the new expiration time for the IP address to handset 10. The new expiration time selected for the IP address may be a default value; may be a percentage of the time associated with the initial request; based on a system parameter, such as capacity for example; or it may be based upon the user profile of the particular handset.

Once the handset 10 has the new time for expiration of the IP address, handset 10 may communicate directly with application server/client 40 via an application registration 63. Or, alternatively, application server client 40 may make a direct DNS query to retrieve the handset's IP address. If the application server client 40 made a DNS query, it will then receive a DNS reply which includes the IP address of the handset and the new time remaining 65.

Figure 4:
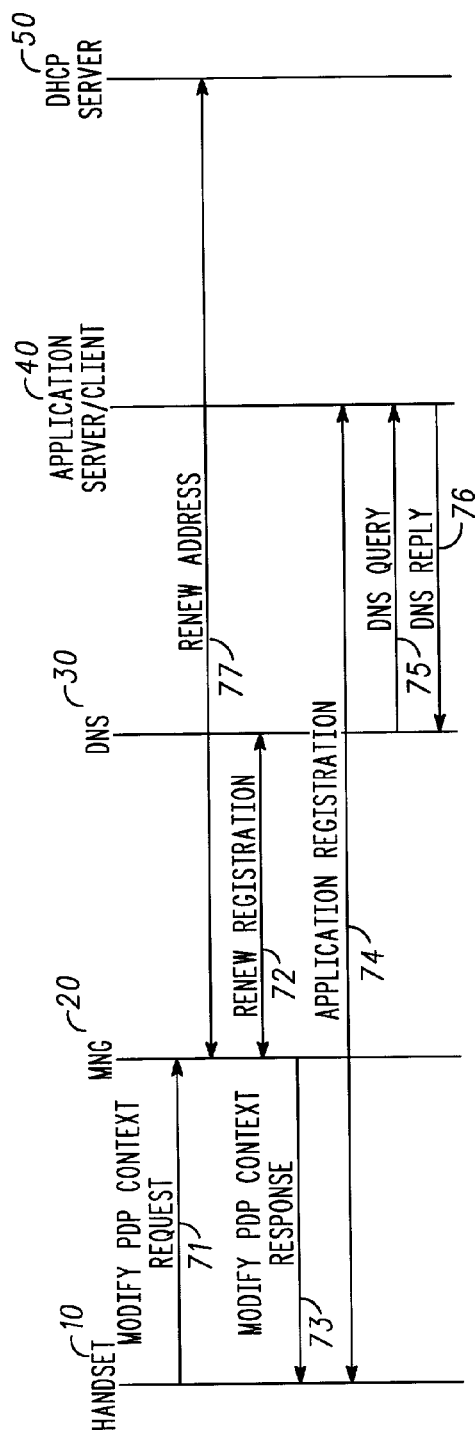
FIG. 4 is a message flow diagram of a mobile unit request for an extension of time of an Internet Protocol address in accordance with the present invention.

FIG. 4 is a message flow diagram of a IP address lease renewal initiated by handset 10. Handset 10 transmits a modify PDP request 71 to MNG 20. This request will include the new lease time requested. If the MNG 20 is able to honor the request from its pool of IP addresses, it will do so. If the address was not allocated by the MNG or if the address pool is unavailable, MNG 20 will transmit a renew address request 77 to DHCP server 50. This request will include the IP address in use by the handset and the time requested for validity of the IP address. DHCP server 50 will respond with the time granted and IP address to MNG 20 via response message 77.

If the handset has a name, MNG 20 will transmit a renew address/name registration 72 to Domain Name Server 30. This message will include the handset name, the IP address of handset 10 and the time for validity of the IP address. Domain Name Server 30 will acknowledge the request to MNG 20 via response message 72.

MNG 20 will then return the new time validation to handset 10 via the modify PDP response 73.

Handset 10 may then directly make an application of registration 74 at the application server client 40. Or an application server 40 can request a DNS query 75 of the Domain Name Server 30 at any time. Domain Name Server 30 will then provide a DNS reply 76 to application server providing the IP address of handset 10 and the valid time for that address.

Again, the extended time granted by the MNG 20 or the DHCP server 50 may be based on a default value; percentage of the initial time request; based upon a system parameter, such as capacity for example; or based upon a particular user profile for the handset.

As can be seen, the arrangement of FIG. 4 provides an alternate means of generating the request for a renewal of the time validity of the IP address. The handset 10 may directly control initiation of this as opposed to the previous method of permitting the MNG or network 20 to automatically control the time request.

Figure 5:
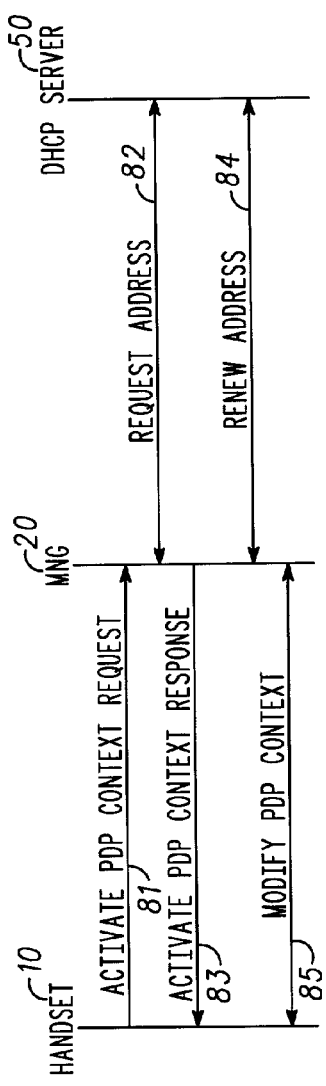
FIG. 5 is a message flow diagram of a network request to a handset for renewal of an extension of time for an Internet Protocol address in accordance with the present invention.

Referring to FIG. 5, a message flow diagram for an IP address management is shown. Similar to the previous method, handset 10 produces an activate PDP request 81 to MNG 20. This request includes a request for time for the associated Internet Protocol address. MNG 20 either allocates an address from its own address pool or requests an address from the DHCP (Dynamic Host Configuration Protocol) server 50 with the time provided by the handset in Internet Protocol address request message 82. DHCP server 50 then responds to MNG with the time granted via message 82. MNG 20 then returns the IP address and expiration time back to the handset 10 via activate PDP response 83.

When the validity time of the IP address is about to expire, MNG 20 renews the address either using its own address pool or via renewal address message 84 to DHCP server 50. Prior to the expiration of the IP address validity, MNG 20 sends a modify PDP message 85 including the new time the IP address is valid to handset 10. If handset 10 either is not available to receive the modify message 85 or does not respond to the modify message 85, MNG 20 initiates deactivation of the IP address.

As can be seen from the above explanations, a number of methods have been shown for automatically or semi-automatically extending the time of an IP address for a mobile handset. This may be accomplished automatically by the network, automatically under direction of the handset or automatically by the network with verification of the handset's active status. Great amounts of system overhead, air time and costs may be saved as a result of these methods.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A method for management of an Internet Protocol (IP) address of a mobile station through a network, the method comprising the steps of:

obtaining by the network the IP address and a validity time period for the mobile station, wherein the step of obtaining includes the step of requesting by the mobile station the IP address and validity time period from the network, wherein the step of obtaining further includes the step of requesting by the network the IP address and the validity time period from a Dynamic Host Configuration Protocol (DHCP);

transmitting the IP address and the validity time period to the mobile station;

renewing the IP address for a new validity time period;

if the IP address was obtained from the Dynamic Host Configuration Protocol (DHCP), requesting by the network the new validity time period to the Dynamic Host Configuration Protocol (DHCP); and if a handset name is available, registering by the network the new validity time period for the IP address and name to a Domain Name Server.

2. A method for management of an Internet Protocol (IP) address of a mobile station through a network, the method comprising the steps of:

obtaining by the network the IP address and a validity time period for the mobile station;

transmitting the IP address and the validity time period to the mobile station; and renewing the IP address for a new validity time period;

requesting services by the mobile station from an application server;

inquiring by the application server the IP address and a new validity time period from a Domain Name Served; and responding to the application server by the Domain Name Served with the IP address and a time remaining of the new validity time period to the application server.

3. A method for management of an Internet Protocol (IP) address of a mobile station through a network, the method comprising the step of;

obtaining by the network the IP address and a validity time period for the mobile station;

requesting by the mobile station a new validity time period for the IP address to the network;

prior to an expiration of the validity time period and subsequent to the step of requesting by the mobile station, renewing by the network the IP address for the new validity time period; and providing the new validity time period associated with a name to the Domain Name Server by the network.

4. A method for management of an Internet Protocol (IP) address of a mobile station through a network, the method comprising the steps of:

obtaining by the mobile station the IP address and a validity time period for the IP address;

prior to an expiration of the validity time period, renewing by the network the IP address for a new validity time period;

transmitting by the network to the mobile station the new validity time period; and receiving an update response by the network from the mobile station indicating that the mobile station is active; and deactivating the IP address and the new validity time for a failure of a modify procedure between the mobile station and the network.

\* \* \* \* \*